United States Patent
Tanveer et al.

(10) Patent No.: US 12,198,720 B2
(45) Date of Patent: Jan. 14, 2025

(54) SYSTEMS AND METHODS FOR SPEAKER DIARIZATION

(71) Applicant: Spotify AB, Stockholm (SE)

(72) Inventors: Md. Iftekhar Tanveer, Revere, MA (US); Diego Fernando Lorenzo Casabuena Gonzalez, New York, NY (US); Jussi Jerker Karlgren, Stockholm (SE); Rosemary Ellen Jones, Cambridge, MA (US)

(73) Assignee: Spotify AB, Stockholm (SE)

( * ) Notice: Subject to any disclaimer, the term of this patent is extended or adjusted under 35 U.S.C. 154(b) by 294 days.

(21) Appl. No.: 17/932,249

(22) Filed: Sep. 14, 2022

(65) Prior Publication Data

US 2023/0402058 A1 Dec. 14, 2023

Related U.S. Application Data

(60) Provisional application No. 63/351,262, filed on Jun. 10, 2022.

(51) Int. Cl.
*G10L 25/87* (2013.01)

(52) U.S. Cl.
CPC .................... *G10L 25/87* (2013.01)

(58) Field of Classification Search
CPC ......... G10L 25/87; G10L 17/02; G10L 25/78; G10L 17/08
USPC ........................................................ 704/201
See application file for complete search history.

(56) References Cited

U.S. PATENT DOCUMENTS

| | | |
|---|---|---|
| 2020/0219517 A1 | 7/2020 | Wang et al. |
| 2024/0119943 A1* | 4/2024 | Kang ............... G10L 17/02 |
| 2024/0160849 A1* | 5/2024 | Fanelli ............. G10L 17/18 |

FOREIGN PATENT DOCUMENTS

CN 111179959 A 5/2020

OTHER PUBLICATIONS

Singh, "Speaker Diarization", retrieved from https://medium.com/datadriveninvestor/speaker-diarization-22121f1264b1, Dec. 20, 2018, 26 pgs.

Vipperla et al., "Speech Overlap Detection and Attribution using convolutive non-negative sparse coding", 20$^{th}$ European Signal Processing Conference (EUSIPCO 2012) Bucharest, Romania, Aug. 2012, 6 pgs.

Jones et al., "TREC 2020 Podcasts Track Overview", The Proceedings of the Twenty-Ninth Text Retrieval Conference Proceedings (TREC 2020), Mar. 17, 2021, 17 pgs.

(Continued)

*Primary Examiner* — Thierry L Pham
(74) *Attorney, Agent, or Firm* — Morgan, Lewis & Bockius LLP

(57) ABSTRACT

The various implementations described herein include methods and devices for speaker diarization. In one aspect, a method includes obtaining an audio recording and generating an embedding signal from the audio recording. The method further includes factoring the embedding signal to obtain a basis matrix and an activation matrix, including obtaining a sparse optimization of the embedding signal by minimizing a norm corresponding to the factored embedding signal. The method also includes generating a speaker log for the audio recording based on the sparse optimization of the embedding signal.

20 Claims, 12 Drawing Sheets

(56) References Cited

OTHER PUBLICATIONS

Jones et al., "Current Challenges and Future Directions in Podcast Information Access", SIGIR '21: Proceedings of the 44th International ACM SIGIR Conference on Research and Development in Information Retrieval, Jun. 17, 2021, 12 pgs.
Karlgren et al., "TREC 2021 Podcasts Track Overview", NIST Special Publication XXX: The Thirtieth Text Retrieval Conference Proceedings (TREC 2021) 18 pgs.
Clifton et al., "100,000 Podcasts: A Spoken English Document Corpus", Proceedings of the 28th International Conference on Computational Linguistics, Barcelona, Spain, Dec. 2020, 15 pgs.
Park et al., "A Review of Speaker Diarization: Recent Advances with Deep Learning", Computer, Speech, and Language, Nov. 29, 2021, 29 pgs.
Dehak et al., "Front-End Factor Analysis For Speaker Verification", IEEE Transactions On Audio, Speech And Language Processing, vol. 19, Issue 4, May 2011, 12 pgs.
Heigold et al., "End-to-End Text-Dependent Speaker Verification", 2016 IEEE International Conference on Acoustics, Speech and Signal Processing (ICASSP), 2016, 5 pgs.
Snyder et al., "X-vectors: Robust DNN Embeddings for Speaker Recognition", 2018 IEEE International Conference on Acoustics, Speech and Signal Processing (ICASSP), Sep. 2018, 5 pgs.
Ning et al., "A Spectral Clustering Approach to Speaker Diarization", Interspeech, 2006, 4 pgs.
Shum et al., "Unsupervised Methods for Speaker Diarization: An Integrated and Iterative Approach", IEE Transactions on Audio, Speech, and Language Processing, vol. 21, No. 10, Oct. 2013, 15 pgs.
Wang et al., "Speaker Diarization with LSTM", 2018 IEEE International Conference on Acoustics, Speech and Signal Processing (ICASSP), Jan. 23, 2022, 5 pgs.
Sell et al., "Diarization is Hard: Some Experiences and Lessons Learned for the JHU Team in the Inaugural DIHARD Challenge", Interspeech 2018, 5 pgs.
Kenny et al., "Diarization of Telephone Conversations using Factor Analysis", IEEE Journal of Special Topics in Signal Processing, vol. 4, Issue 6, Dec. 2010, 12 pgs.
Valente et al., "Variational Bayesian Speaker Diarization of Meeting Recordings", 2010 IEEE International Conference on Acoustics, Speech and Signal Processing, 2010, 4 pgs.
Bullock et al., "Overlap-Aware Diarization: Resegmentation Using Neural End-To-End Overlapped Speech Detection", ICASSP 2020-2020 IEEE International Conference on Acoustics, Speech and Signal Processing (ICASSP), Oct. 25, 2019, 5 pgs.
Fujita et al., "End-to-End Neural Speaker Diarization with Self-Attention", 2019 IEEE Automatic Speech Recognition and Understanding Workshop (ASRU), Sep. 13, 2019, 8 pgs.
Dey et al., "End-to-end text-dependent speaker verification using novel distance measures", Interspeech, Hyderabad, India, Sep. 2018, 5 pgs.
Shafey et al., "Joint Speech Recognition and Speaker Diarization via Sequence Transduction", Interspeech 2019, Jul. 9, 2019, 5 pgs.
Boakye et al., "Overlapped Speech Detection For Improved Speaker Diarization In Multiparty Meetings", 2008 IEEE International Conference on Acoustics, Speech and Signal Processing, 2008, 4 pgs.
Geiger et al., "Detecting Overlapping Speech with Long Short-Term Memory Recurrent Neural Networks", Interspeech 2013, 5 pgs.
Raj et al., "DOVER-Lap: A Method for Combining Overlap-Aware Diarization Outputs", 2021 IEEE Spoken Language Technology Workshop (SLT), 2021, 8 pgs.
Zhang et al., "Fully Supervised Speaker Diarization", ICASSP 2019-2019 IEEE International Conference on Acoustics, Speech and Signal Processing (ICASSP), Feb. 19, 2019, 5 pgs.
Candès, "The restricted isometry property and its implications for compressed sensing", Theory of Signals/Mathematical Analysis, C. R. Acad. Sci. Paris, vol. 346, 2008, 4 pgs.
Candès et al., "Stable Signal Recovery from Incomplete and Inaccurate Measurements", Communications on Pure and Applied Mathematics, vol. 59, Issue 8, Dec. 7, 2005, 15 pgs.
Nagrani et al., "Voxceleb: Large-scale speaker verification in the wild", Computer Speech & Language 60, 2020, 15 pgs.
Howard et al., "MobileNets: Efficient Convolutional Neural Networks for Mobile Vision Applications", Apr. 17, 2017, 9 pgs.
Beck et al., "A Fast Iterative Shrinkage-Thresholding Algorithm for Linear Inverse Problems", SIAM J. Imaging Sciences, vol. 2, No. 1, 2009 Society for Industrial and Applied Mathematics, 20 pgs.
Wengert, "A Simple Automatic Derivative Evaluation Program", Communications of the ACM, vol. 7, No. 8, Aug. 1964, 2 pgs.
Kingma et al., "Adam: A Method for Stochastic Optimization", ICLR 2015, Jan. 30, 2017, 15 pgs.
Satopaa et al., "Finding a "Kneedle" in a Haystack: Detecting Knee Points in System Behavior", 2011 31st International Conference on Distributed Computing Systems Workshops, 2011, 6 pgs.
Mao et al., "Speech Recognition and Multi-Speaker Diarization of Long Conversations", Nov. 5, 2020, 5 pgs.
Chung et al., "Spot the conversation: speaker diarisation in the wild", Aug. 15, 2021, 5 pgs.
Bredin et al., "Pyannote.Audio: Neural Building Blocks for Speaker Diarization", ICASSP 2020-2020 IEEE International Conference on Acoustics, Speech and Signal Processing (ICASSP), Nov. 4, 2019 5 pgs.

\* cited by examiner

Algorithm 1: Speaker diarization

Input: $\mathcal{E}, k$
Output: $\Psi, A$

1. $i \leftarrow 0$;
2. $A \leftarrow$ random, $\Psi \leftarrow$ random;
3. while *not converge* do
4.     Compute loss,
   $L = \|\mathcal{E} - \Psi A\|_1 + \lambda_1 \|\Psi\|_1 + \lambda_2 \|A\|_1 + \lambda_3 J$;
5.     Calculate gradient of $L$ w.r.t $\Psi$, $\nabla_\Psi L$;
6.     Update $\Psi$ using Adam:
   $\Psi^{(i+1)} \leftarrow \Psi^{(i)} - \gamma_\Psi \nabla_\Psi L$;
7.     $\Psi^{(i+1)} \leftarrow \text{shrink}(\Psi^{(i+1)})$;
8.     $\Psi^{(i+1)} \leftarrow \text{project}_{\text{unitdisk}}(\Psi^{(i+1)})$;
9.     Recompute loss,
   $L = \|\mathcal{E} - \Psi A\|_1 + \lambda_1 \|\Psi\|_1 + \lambda_2 \|A\|_1 + \lambda_3 J$;
10.     Calculate gradient of $L$ w.r.t $A$, $\nabla_A L$;
11.     Update $A$ using Adam
    $A^{(i+1)} \leftarrow A^{(i)} - \gamma_A \nabla_A L$;
12.     $A^{(i+1)} \leftarrow \text{shrink}(A^{(i+1)})$;
13.     $A^{(i+1)} \leftarrow \text{project}_{[0,1]}(A^{(i+1)})$;
14.     $i \leftarrow i + 1$

FIG. 6D

SYSTEMS AND METHODS FOR SPEAKER DIARIZATION

PRIORITY APPLICATION

This application claims priority to U.S. Prov. App No. 63/351,262, filed Jun. 10, 2022, which is hereby incorporated by reference in its entirety.

TECHNICAL FIELD

The disclosed embodiments relate generally to media provider systems including, but not limited to, systems and methods for speaker diarization and logging of audio content.

BACKGROUND

Recent years have shown a remarkable growth in consumption of digital goods such as digital music, movies, books, and podcasts, among many others. The overwhelmingly large number of these goods often makes navigation of digital goods an extremely difficult task. Some digital goods, such as podcasts, are conversational in nature and speaker changes can be frequent. Content discovery, understanding, and navigation can be further hindered by these frequent speaker changes.

SUMMARY

Speaker diarization is the process of logging times (e.g., logging timestamps) when different speakers spoke in an audio recording. In some circumstances, reliable speaker diarization is needed to build downstream natural language understanding pipelines for podcasts. Podcasts in particular are diverse in content, format, and production styles and thus benefit from speaker diarization techniques that are language agnostic and don't rely on external information, such as metadata regarding number of speakers or labels for supervised learning.

The disclosed embodiments include an unsupervised speaker diarization system with a sparse optimization approach (e.g., as shown in FIG. 4B). In some embodiments, the speaker diarization system includes an embedding component and a sparse optimization component. Some embodiments include a pretrained audio embedding model configured such that the speaker diarization system is overlap aware.

In accordance with some embodiments, a method of speaker diarization for audio content is provided. The method is performed at a computing device having one or more processors and memory. The method includes: (i) obtaining an audio recording; (ii) generating an embedding signal from the audio recording; and (iii) factoring the embedding signal to obtain a basis matrix and an activation matrix, including obtaining a sparse optimization of the embedding signal by minimizing a norm corresponding to the factored embedding signal; and (iv) generating a speaker log for the audio recording based on the sparse optimization of the embedding signal.

In accordance with some embodiments, an electronic device is provided. The electronic device includes one or more processors and memory storing one or more programs. The one or more programs include instructions for performing any of the methods described herein (e.g., the method 700).

In accordance with some embodiments, a non-transitory computer-readable storage medium is provided. The non-transitory computer-readable storage medium stores one or more programs for execution by an electronic device with one or more processors. The one or more programs comprising instructions for performing any of the methods described herein (e.g., the method 700).

Thus, devices and systems are disclosed with methods for speaker diarization of audio content. Such methods, devices, and systems may complement or replace conventional methods, devices, and systems for speaker diarization of audio content.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIG. 6D illustrates an example algorithm for optimization in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
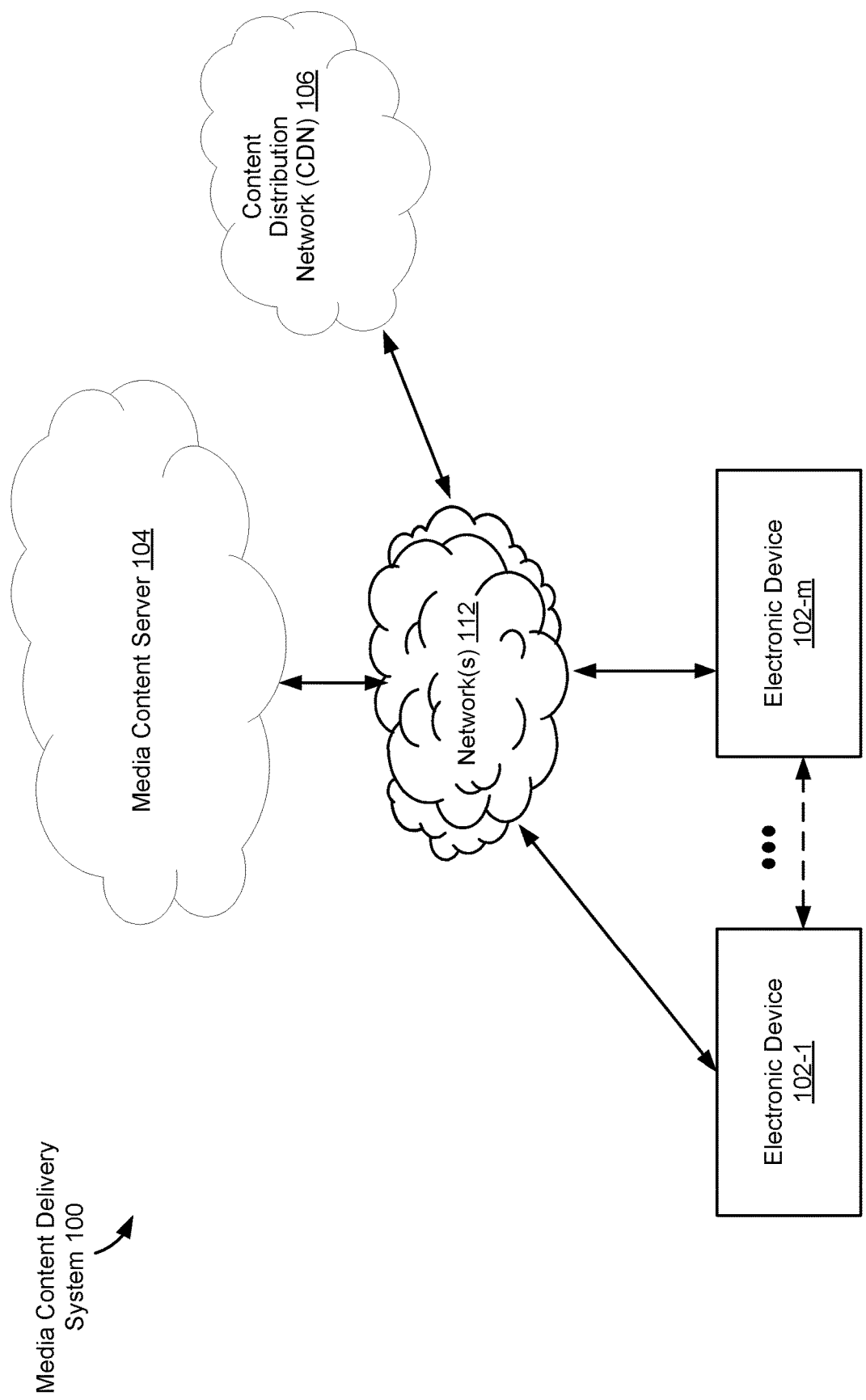
FIG. 1 is a block diagram illustrating a media content delivery system in accordance with some embodiments.

FIG. 1 is a block diagram illustrating a media content delivery system 100 in accordance with some embodiments. The media content delivery system 100 includes one or more electronic devices 102 (e.g., electronic device 102-1 to electronic device 102-*m*, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and 102-$m$ are the same type of device (e.g., electronic device 102-1 and electronic device 102-$m$ are both speakers). Alternatively, electronic device 102-1 and electronic device 102-$m$ include two or more different types of devices.

In some embodiments, electronic devices 102-1 and 102-$m$ send and receive media-control information through network(s) 112. For example, electronic devices 102-1 and 102-$m$ send media control requests (e.g., requests to play music, podcasts, movies, videos, or other media items, or playlists thereof) to media content server 104 through network(s) 112. Additionally, electronic devices 102-1 and 102-$m$, in some embodiments, also send indications of media content items to media content server 104 through network(s) 112. In some embodiments, the media content items are uploaded to electronic devices 102-1 and 102-$m$ before the electronic devices forward the media content items to media content server 104.

In some embodiments, electronic device 102-1 communicates directly with electronic device 102-$m$ (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-$m$. In some embodiments, electronic device 102-1 communicates with electronic device 102-$m$ through network(s) 112. In some embodiments, electronic device 102-1 uses the direct connection with electronic device 102-$m$ to stream content (e.g., data for media items) for playback on the electronic device 102-$m$.

In some embodiments, electronic device 102-1 and/or electronic device 102-$m$ include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
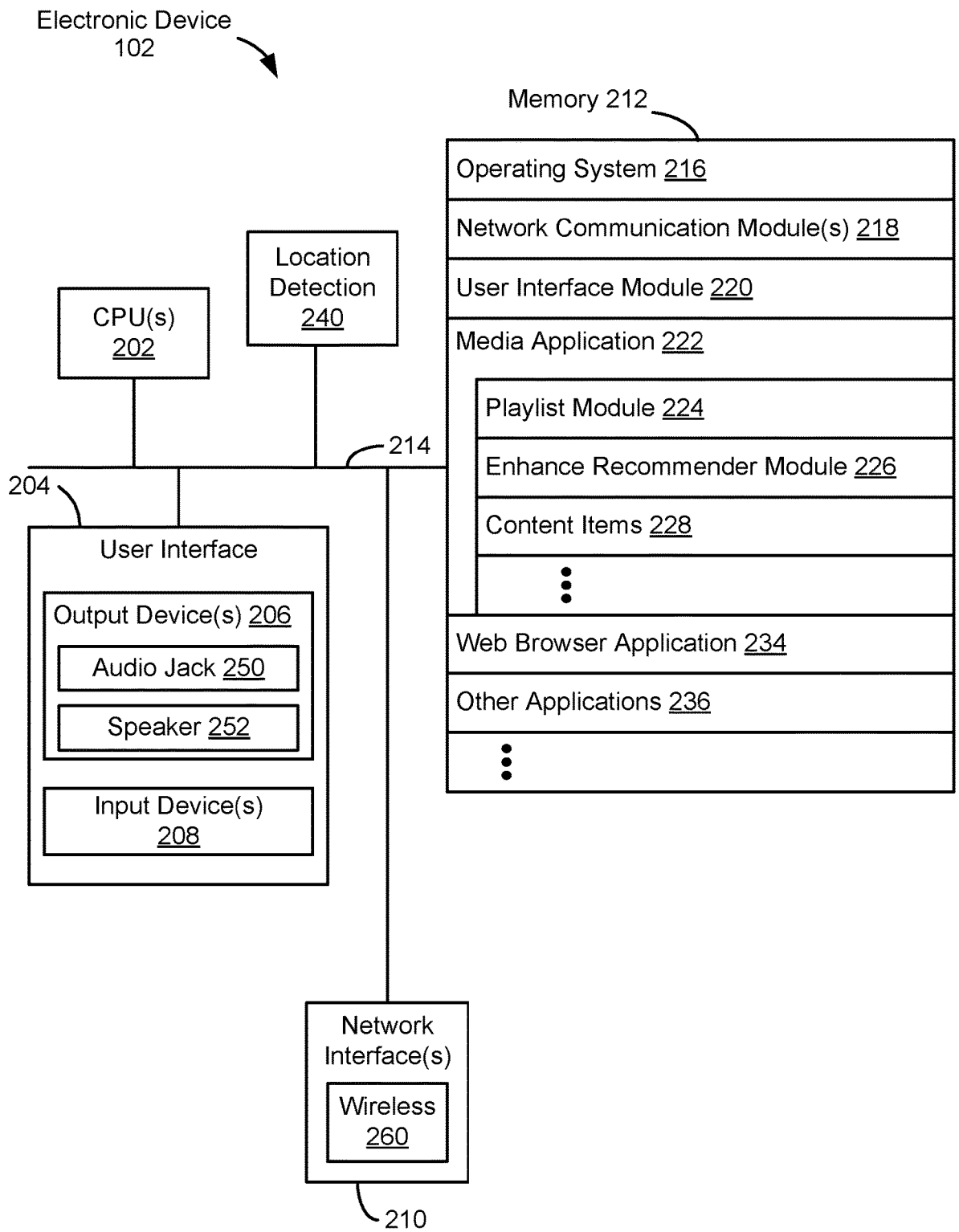
FIG. 2 is a block diagram illustrating an electronic device in accordance with some embodiments.

FIG. 2 is a block diagram illustrating an electronic device 102 (e.g., electronic device 102-1 and/or electronic device 102-$m$, FIG. 1), in accordance with some embodiments. The electronic device 102 includes one or more central processing units (CPU(s), e.g., processors or cores) 202, one or more network (or other communications) interfaces 210, memory 212, and one or more communication buses 214 for interconnecting these components. The communication buses 214 optionally include circuitry (sometimes called a chip set) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media presentation system(s), media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
  - a playlist module 224 for storing sets of media items for playback in a predefined order;
  - a recommender module 226 for identifying and/or displaying recommended media items to include in a playlist;
  - a discovery model 227 for identifying and presenting media items to a user;
  - a content items module 228 for storing media items, including audio items such as podcasts and songs, for playback and/or for forwarding requests for media content items to the media content server;
- a web browser application 234 for accessing, viewing, and interacting with web sites; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
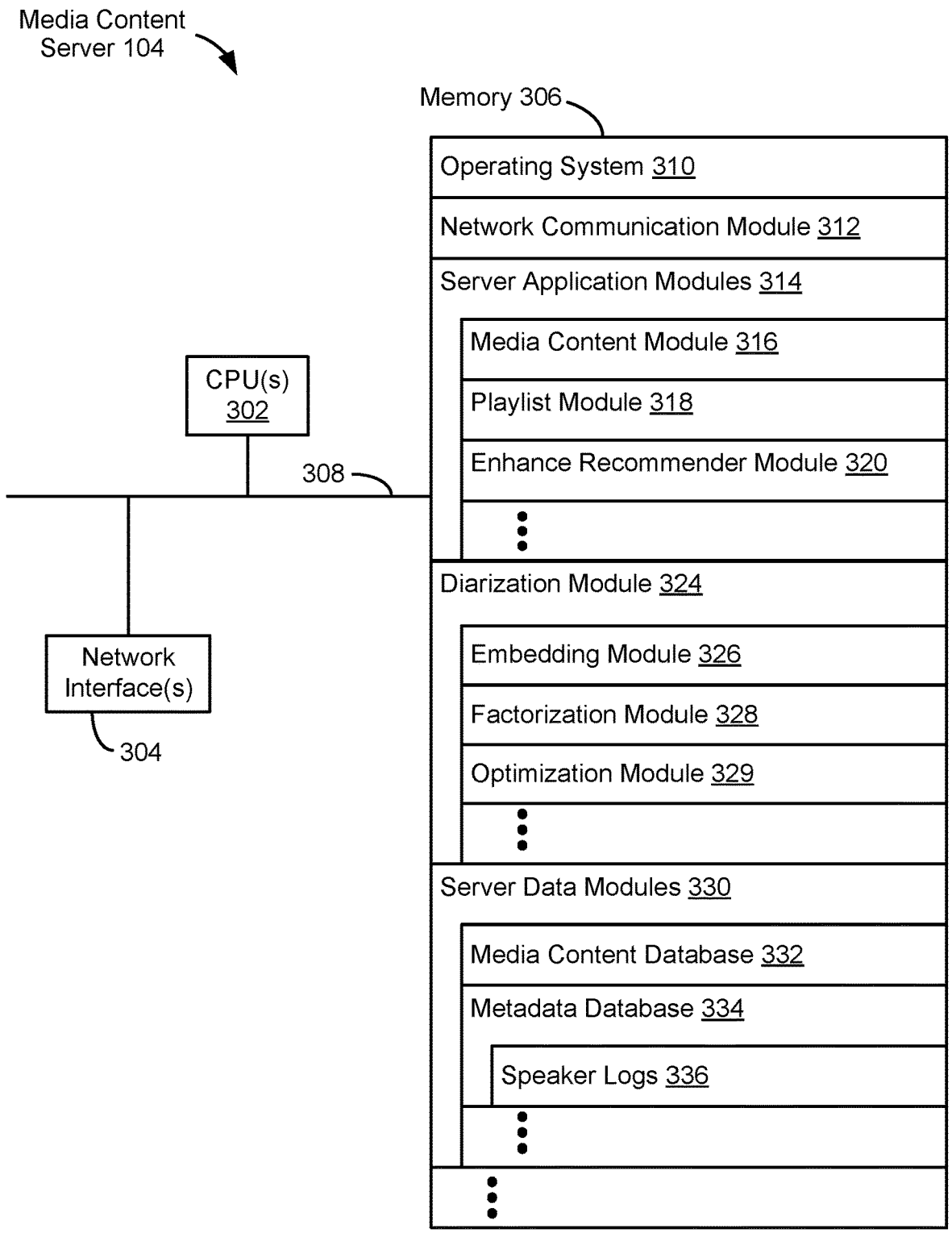
FIG. 3 is a block diagram illustrating a media content server in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random-access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, ora subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content module 316 for storing one or more media content items and/or sending (e.g., streaming), to the electronic device, one or more requested media content item(s);
  - a playlist module 318 for storing and/or providing (e.g., streaming) sets of media content items to the electronic device;
  - a recommender module 320 for determining and/or providing recommendations for a playlist;
- a diarization module 324 for diarization of audio content and creation of speaker logs or metadata including, but not limited to, one or more of:
  - an embedding module 326 for generating an embedding signal from audio content (e.g., a VggVox embedder);
  - a factorization module 328 for factorizing the embedding signal into an embedding basis matrix and an activation matrix (e.g., a matrix product of the basis matrix and the activation matrix); and
  - an optimization module 329 for sparse optimization of the factorized embedding signal (e.g., via minimization of $l_1$ norms);
- one or more server data module(s) 330 for handling the storage of and/or access to media items and/or metadata relating to the media items; in some embodiments, the one or more server data module(s) 330 include:
  - a media content database 332 for storing media items; and
  - a metadata database 334 for storing metadata relating to the media items, such as a genre associated with the respective media items. In some embodiments, the metadata database includes one or more speaker logs 336 for the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (e.g., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4A:
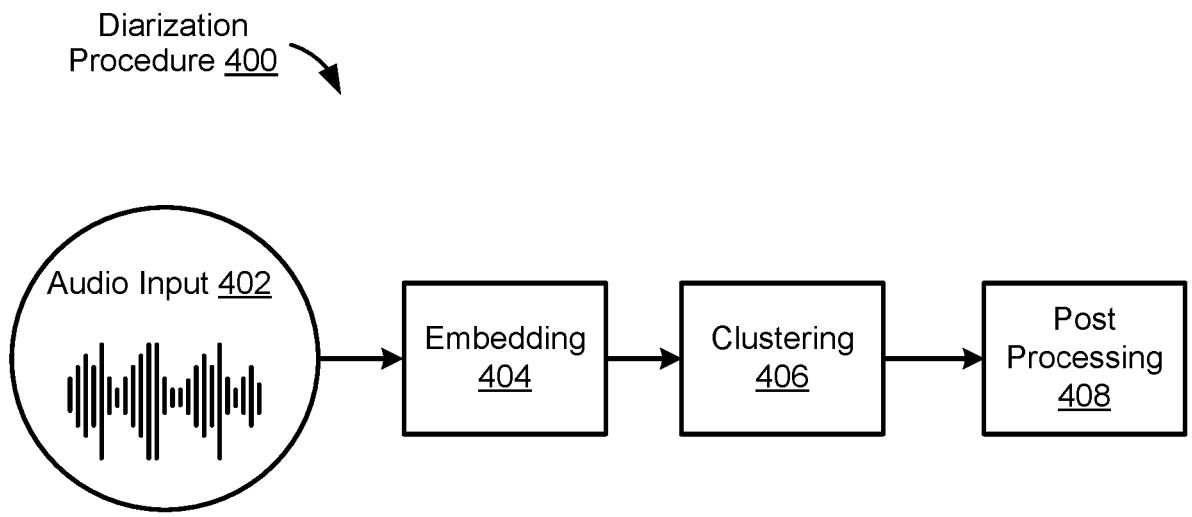
FIG. 4A is a block diagram illustrating a speaker diarization procedure in accordance with some embodiments.

FIG. 4A is a block diagram illustrating a speaker diarization procedure 400 in accordance with some embodiments. FIG. 4A shows an embedding 404 applied to an audio input 402 to generate an embedding signal. A clustering algorithm 406 is applied to the embedding signal, and post processing 408 is performed to distinguish speakers and identify overlapping speech.

Some diarization techniques utilize a pipeline similar to the one shown in FIG. 4A. The pipeline involves several independent components. An embedding component (e.g, the embedding 404) segments the audio into small chunks and converts each chunk into a vector that represents the auditory characteristics of the speech heard in a chunk and the speakers who produce it. The clustering component (e.g., the clustering 406) divides those vectors into several groups, e.g., by applying spectral clustering or agglomerative clustering. The post processing component (e.g., post processing 408) addresses some issues not handled by the previous components, such as detecting overlapping speech with more than one simultaneous speaker.

Research in speaker diarization has focused on independently improving the performances of these blocks in FIG. 4A. Some end-to-end learning models (e.g., deep learning models) use combinations of multiple modalities (e.g., audio and text). For example, some algorithms perform speech recognition jointly with diarization. However, a drawback of incorporating textual information into a diarization algorithm is that it renders the algorithm dependent on language.

Such an algorithm may require retraining for every supported language (which may quickly become impracticable).

The clustering component can introduce several problems for diarization. Many clustering algorithms require a pre-determined number of clusters, which in the diarization scenario corresponds to the number of distinct speakers. However, in some circumstances it is impractical or impossible to determine the number of speakers beforehand. Additionally, many clustering algorithms group the audio segments into disjoint clusters. This approach makes identifying overlapping speech (a frequent occurrence in natural and unscripted conversation, such as in podcasts) a challenge that may require one or more post processing modules, e.g., based on hidden Markov models or neural networks. Fully supervised speaker diarization approaches require manual annotation of large training data sets, which can be costly and time-consuming. In addition, in some circumstances a training dataset is required to be balanced over various languages, production styles, and format categories (e.g., audiobooks, enacted drama, panel discussions etc.). Such a training dataset requires considerable engineering effort.

Human perception is capable of performing speaker diarization without understanding the language. Accordingly, diarization is a task that should be solvable without specific training or specific knowledge resources for the language being spoken. The disclosed embodiments include an audio-only solution for speaker diarization that is naturally language agnostic.

Figure 4B:
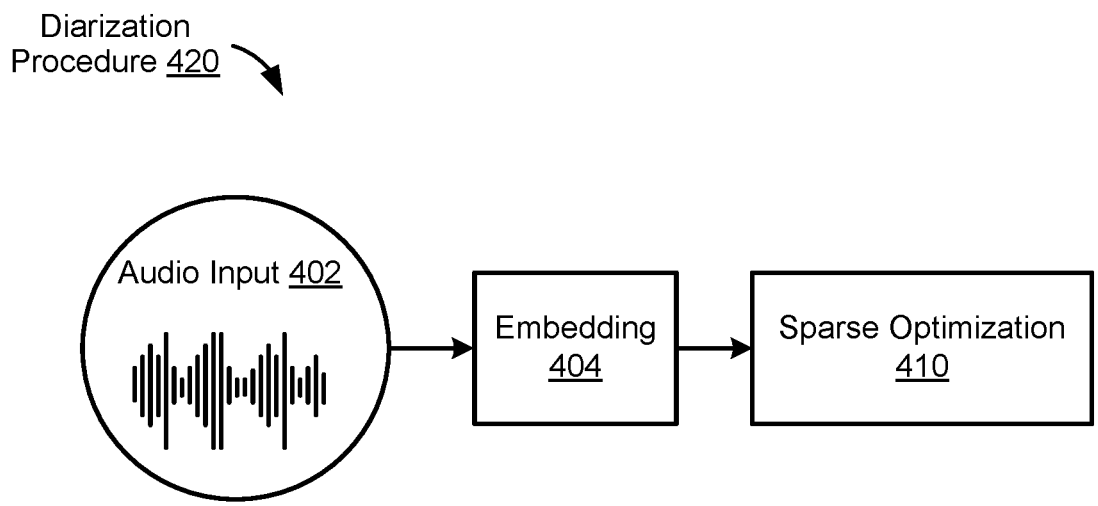
FIG. 4B is a block diagram illustrating another speaker diarization procedure in accordance with some embodiments.

FIG. 4B is a block diagram illustrating a speaker diarization procedure 420 in accordance with some embodiments. FIG. 4B shows the embedding 404 applied to the audio input 402. A sparse optimization algorithm 410 is applied to the embedding signal to distinguish speakers and identify overlapping speech.

In accordance with some embodiments, the speaker diarization procedure 420 includes an unsupervised speaker diarization algorithm that replaces the clustering 406 and the post-processing 408 described above with a sparse optimization (e.g., $l_1$ regularized) approach as shown in FIG. 4B, e.g., to avoid the problems described above with respect to FIG. 4A. In some embodiments, a pretrained audio embedding model is used with characteristics that allows the algorithm to be overlap aware. In some embodiments, the hyperparameters for the processing model and algorithm are automatically adjusted by employing theories from compressed sensing and linear algebra, thereby making it tune-free from the users' perspective. In some embodiments, the optimization problem is solved using first-order gradient techniques, thereby making it scalable with frameworks such as Tensorflow or Py Torch and hardware such as Graphical Processing Units (GPUs).

In some embodiments, the diarization procedure 420 does not require additional information about the audio input 402 (e.g., does not require additional metadata). In this way, the diarization procedure 420 can be used on large sets of media items (e.g., millions of podcasts) without requiring tuning or adjusting the procedure manually for every different podcast. In addition, the diarization procedure 420 functions with an "open set" of speakers (e.g., labeled speaker data is not required). In some embodiments, irrespective of the characteristics of each individual speaker's voice, the procedure conducts the diarization without any human intervention (e.g., the diarization is automatic).

Figure 5A:
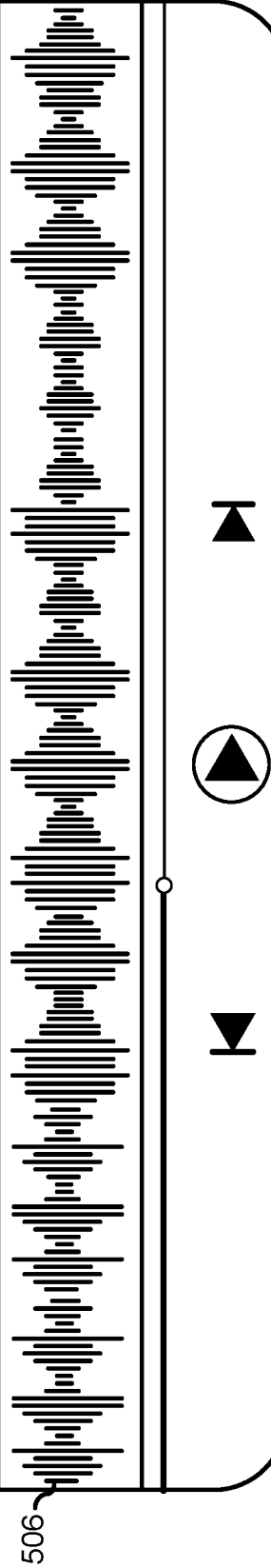
FIG. 5A illustrates an example user interface for media content in accordance with some embodiments.
Figure 5B:
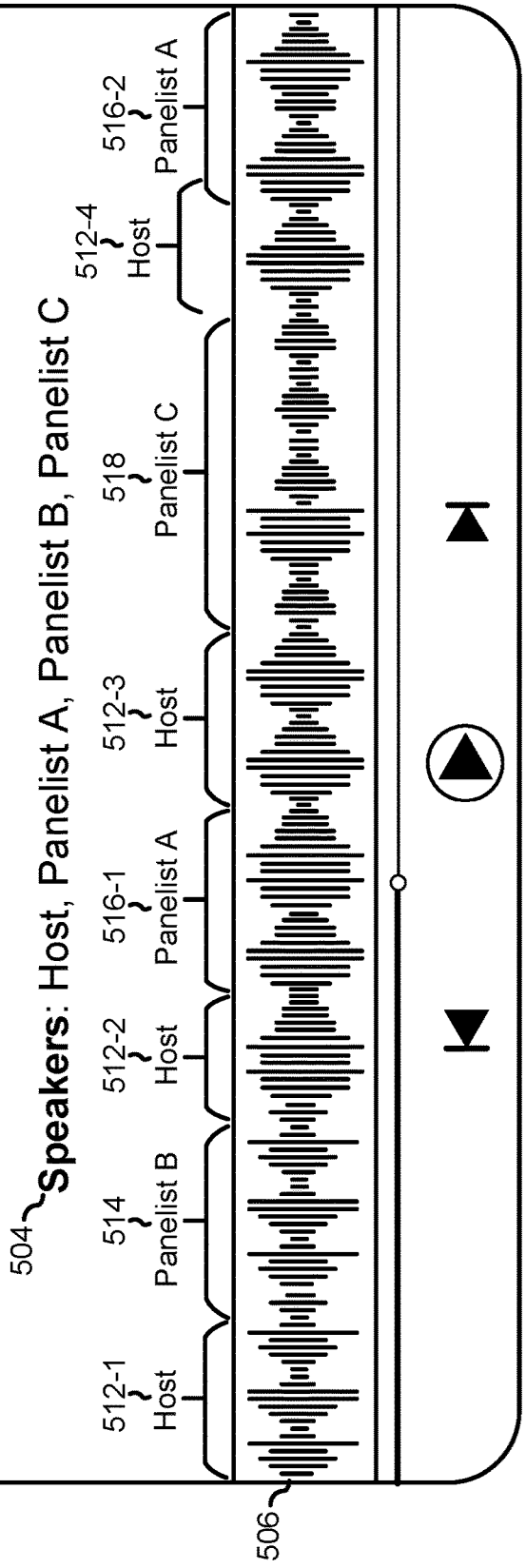
FIG. 5B illustrates the user interface of FIG. 5A with speaker labels in accordance with some embodiments.

FIG. 5A illustrates a user interface 502 for media content in accordance with some embodiments. The user interface 502 includes information about a podcast episode with speakers 504 that include a host and panelists A, B, and C. The user interface 502 further includes an audio timeline 506. FIG. 5B illustrates the user interface 502 with speaker labels in accordance with some embodiments. In particular, the user interface 502 in FIG. 5B includes speaker labels on the audio timeline 506 indicating times when the host is speaking (e.g., portions 512-1, 512-2, 512-3, and 512-4), time portions 516-1 and 516-2 when panelist A is speaking, time portion 514 when panelist B is speaking, and time portion 618 and panelist C is speaking.

Figure 6A:
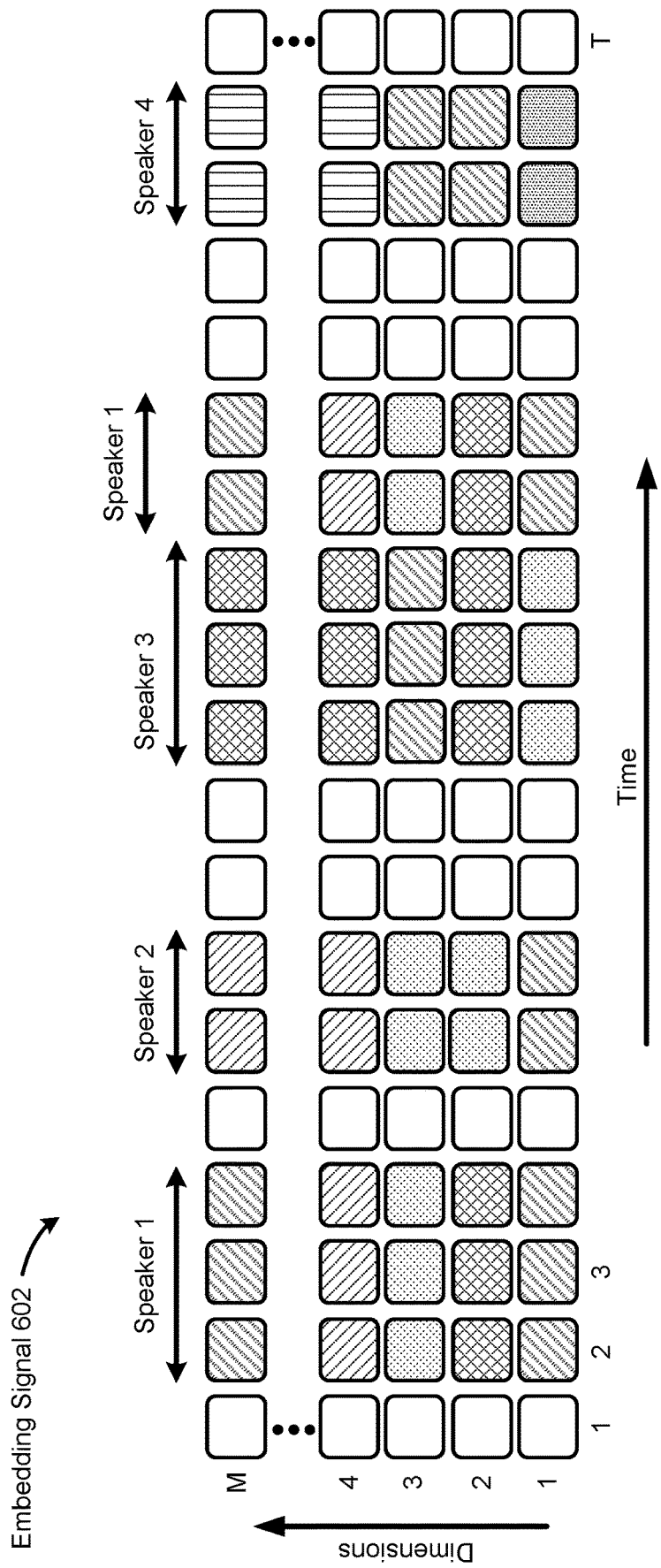
FIG. 6A is a block diagram illustrating an embedding signal in accordance with some embodiments.

FIG. 6A is a block diagram illustrating an embedding signal 602 in accordance with some embodiments. The embedding signal corresponds to an audio input (e.g., the audio input 402) and includes M-dimensional embeddings (e.g., 256, 512, or 1028 dimensions) and T time periods. The embeddings correspond to multiple speakers in the corresponding audio content (e.g., speakers 1, 2, 3, and 4) and each time period has a corresponding embedding. In some embodiments, the embedding signal 602 is composed of real numbers (e.g., positive and negative numbers).

In some embodiments, a sequence of M-dimensional vectors is generated for an audio recording, e.g., using a pre-trained VggVox embedder. In some embodiments, the M-dimensional vectors include one or more negative numbers. In some embodiments, embedder is able to capture not only the acoustic characteristics, but also dialectal and stylistic speech characteristics. This allows for the use of vector similarity metrics (e.g., cosine similarity) to identify whether two speech segments are from the same speaker. In some embodiments, the vectors have the characteristic of adhering to a linearity constraint. For example, a VggVox embedding of an audio chunk from speaker $S_1$ of length p concatenated with an audio chunk from speaker $S_2$ of length q is approximately equal to its weighted arithmetic average.

In some embodiments, a recording is segmented into a series of overlapping chunks by sliding a window (e.g., a 4, 6, or 8 second window) over the recording with a variable step size (e.g., a variable step size of 1 second or less). In some embodiments, the step size is set so as to yield at least 3,600 chunks. In some embodiments, a vector is computed for each chunk using a pretrained VggVox model.

In some embodiments, an algorithm (e.g., MobileNet2) is utilized to detect non-speech regions in the recording. In some embodiments, the vectors for non-speech regions are set to zero. In some embodiments, the sequence of the vectors for the recording are arranged into a matrix referred to as an embedding signal (e.g., the embedding signal 602). In some embodiments, the embedding signal is defined as $\varepsilon= \mathbb{R}^{M \times T}$ so that vectors from each of the T timesteps are represented in the columns of the matrix. In some embodiments, the embedding signal is normalized such that the columns are unit vectors.

The embedding signal allows for the use of techniques from compressed sensing for speaker diarization. In some circumstances, the embedding signal is low rank with many dependent columns. This is due to the step size of the sequence being short and speakers not typically changing turns at a rate higher than the step size, such that the columns of the embedding signal remain the same over several consecutive time-steps. The embedding signal can be factored out as a matrix product of an embedding basis matrix and an activation matrix, as illustrated in Equation 1:

$$\varepsilon = \Psi A \qquad \text{Equation 1: Embedding Signal Factorization}$$

where $\varepsilon$ is the embedding signal, $\Psi$ is the embedding basis matrix, and A is the activation matrix. The columns of the embedding basis matrix $\Psi \in \mathbb{R}^{M \times k}$ represent the M-dimensional embeddings for each speaker in the audio, where k is the maximum number of allowed speakers, and T is the length of the embedding signal (e.g., the number of timesteps). The rows of the activation matrix $A \in \mathbb{R}^{k \times T}$ represent which speaker is activated at a given timestep. In some embodiments, the elements of A have a value in the range of 0 to 1. In this way, the diarization problem is converted into a matrix factorization problem. In addition, the formulation does not require the exact number of the speakers in the audio to be known. For example, as long as the value of k is large enough, the formulation works by setting the activation and embedding for all the unused speakers to zero.

Figure 6B:
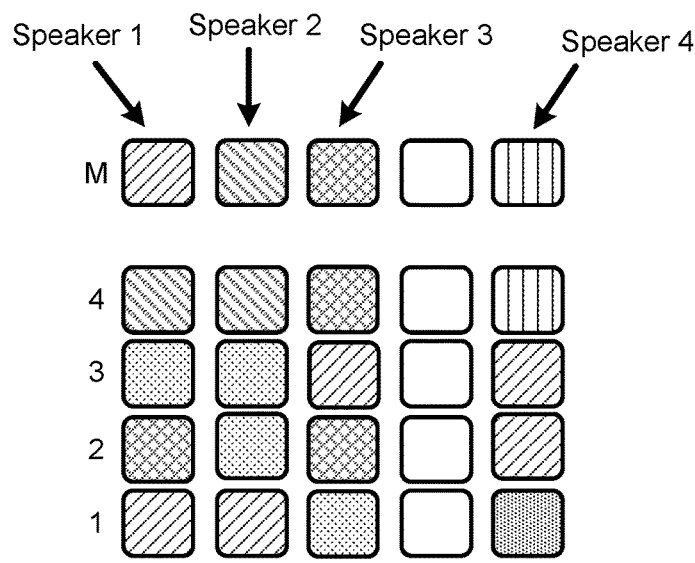
FIG. 6B is a block diagram illustrating an embedding basis matrix in accordance with some embodiments.
Figure 6C:
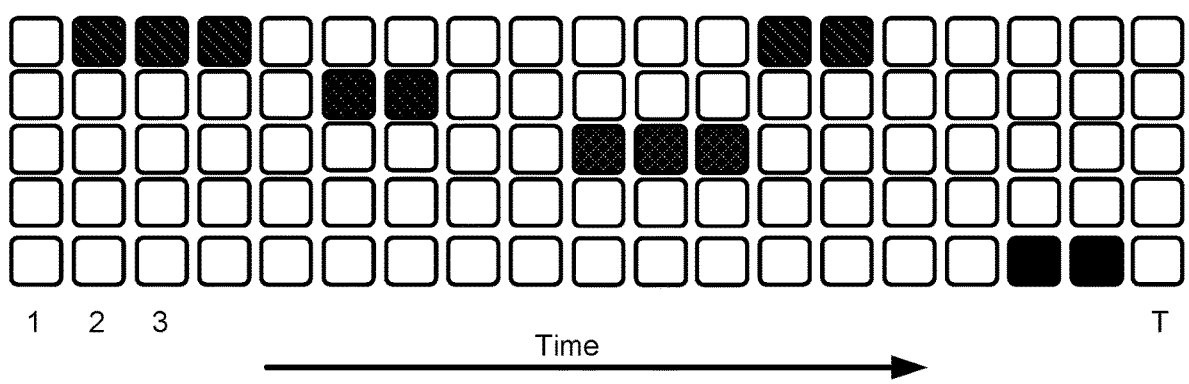
FIG. 6C is a block diagram illustrating an activation matrix in accordance with some embodiments.

FIG. 6B is a block diagram illustrating an embedding basis matrix 650 in accordance with some embodiments. The embedding basis matrix 650 includes an embedding for each individual speaker (e.g., the speakers 1, 2, 3, and 4). FIG. 6C is a block diagram illustrating an activation matrix 660 in accordance with some embodiments. In some embodiments, the activation matrix 660 includes a binary value (e.g., 0 or 1) indicating time periods when each particular embedding is active. In this way, the embedding signal 602 is a matrix product of the embedding basis matrix 650 and the activation matrix 660. In accordance with some embodiments, the embedding basis matrix 650 is a local basis matrix that corresponds to speakers in the audio input and does not include speaker embeddings for speakers not present in the audio input, such as speakers from in a media database (e.g., the basis matrix 650 is not a global basis matrix).

In accordance with some embodiments, the matrix factorization problem is solved using a sparse optimization approach. In some embodiments, the $l_1$ norm of the difference $\|\varepsilon - \Psi A\|_1$ is minimized to enforce model constraint as in Equation 1. In some embodiments, a sparsity constraint is enforced over both $\Psi$ and A by minimizing their $l_1$ norms respectively, e.g., to obtain a unique solution of the underdetermined problem. For example, from the diarization perspective, the sparsity constraint over $\Psi$ enforces that the embedding signal be reconstructed by utilizing as few speakers as possible. Sparsity over A enforces that the solution contains as few nonzero elements for A as possible. In some embodiments, the columns of $\Psi$ are enforced such that each is within a unit disk and the elements of A are within the range [0, 1].

The exact values of the embeddings may vary from time to time depending on the background music or noise in the audio. In some embodiments, e.g., to address this concern, a jitter loss is used that enforces continuity and penalizes producing too many broken values in the rows of A. In some embodiments, this loss is expressed as an $l_1$-norm of the difference between consecutive values in the rows of A.

Equation 2 below represents the overall optimization problem in accordance with some embodiments:

$$\min_{w.r.t.\Psi, A} \|\mathcal{E} - \Psi A\|_1 + \lambda_1 \|\Psi\|_1 + \lambda_2 \|A\|_1 + \lambda_3 J \qquad \text{Equation 2}$$

Sparse Optimization where $\forall_{r,t} \, 0.0 \leq A[r,t] \leq 1.0$ and $\forall_t \|\Psi[:,t]\|_2 \leq 1.0$. In accordance with some embodiments, the jitter loss, J, is defined as:

$$J = \frac{1}{kT} \sum_{r=1}^{k} \sum_{t=2}^{T} |A[r, t] - A[r, t-1]| \qquad \text{Equation 3}$$

Jitter Loss

The objective function shown in Equation 2 is non-convex. However, when either $\Psi$ or A is held fixed, it becomes convex over the other parameter. In some embodiments, the optimization problem is solved by alternatingly updating the two model parameters. In some embodiments, a fast iterative shrinkage thresholding algorithm (FISTA) is used to enforce sparsity over the model parameters, $\Psi$ and A. In some embodiments, the parameters are projected in their respective feasibility space at every iteration. In some embodiments, an optimization algorithm in Tensorflow is used for automatic gradient computation.

FIG. 6D illustrates an algorithm 1 for optimization in accordance with some embodiments. In some embodiments, the shrink operation on a matrix X is defined as:

$$\text{shrink}(X) := \text{sign}(X)\max(0, |X| - \gamma\lambda) \qquad \text{Equation 4: Shrink Operation}$$

where $\gamma$ and $\lambda$ represent the learning rate and the Lagrange multiplier respectively. This operation pushes each component of the matrix towards zero and thus can achieve sparsity quickly.

The project$_{unitdisk}$ and project$_{[0,1]}$ are two projection operations for keeping the magnitudes of the model parameters in check. They are defined as shown below:

$$\text{project}_{unitdisk}(X) := \frac{X[:, c]}{\|X[:, c]\|_2} \forall_{column\ index, c} \qquad \text{Equation 5}$$

Unitdisk Projection $$\text{project}_{[0,1]}(X) := \max\{0, \min(1, X)\} \qquad \text{Equation 6}$$

[0, 1] Projection

In accordance with some embodiments, the use of the $l_1$ norm of $\Psi$ in Equation 2 ensures that algorithm 1 utilizes as few embedding vectors as possible to reconstruct the embedding signal. This process relieves the users from the burden of supplying an exact number of speakers to the algorithm. In some circumstances, setting a maximum number of speakers (k) too high makes the computation unnecessarily slow. In some embodiments, a reasonable value fork is obtained from the estimated rank of the embedding signal. The columns of the embedding signal can be modeled as the embeddings of different speakers that are copied over time. In some embodiments, the number of the speakers is obtained by computing the singular value decomposition of the embedding signal and counting the number of non-zero singular values. In some situations, the measurement noise in the speaker embeddings yields many small but non-zero singular values. In some embodiments, the singular values are sorted in a descending order and the "knee" of the curve is identified (e.g., using the Kneedle algorithm). In some embodiments, the location of the knee is multiplied by a factor of 2.5 which yields a margin of error for the upper bound for number of speakers and ensures that the sparsity constraint for the embedding basis matrix holds.

Figure 6E:
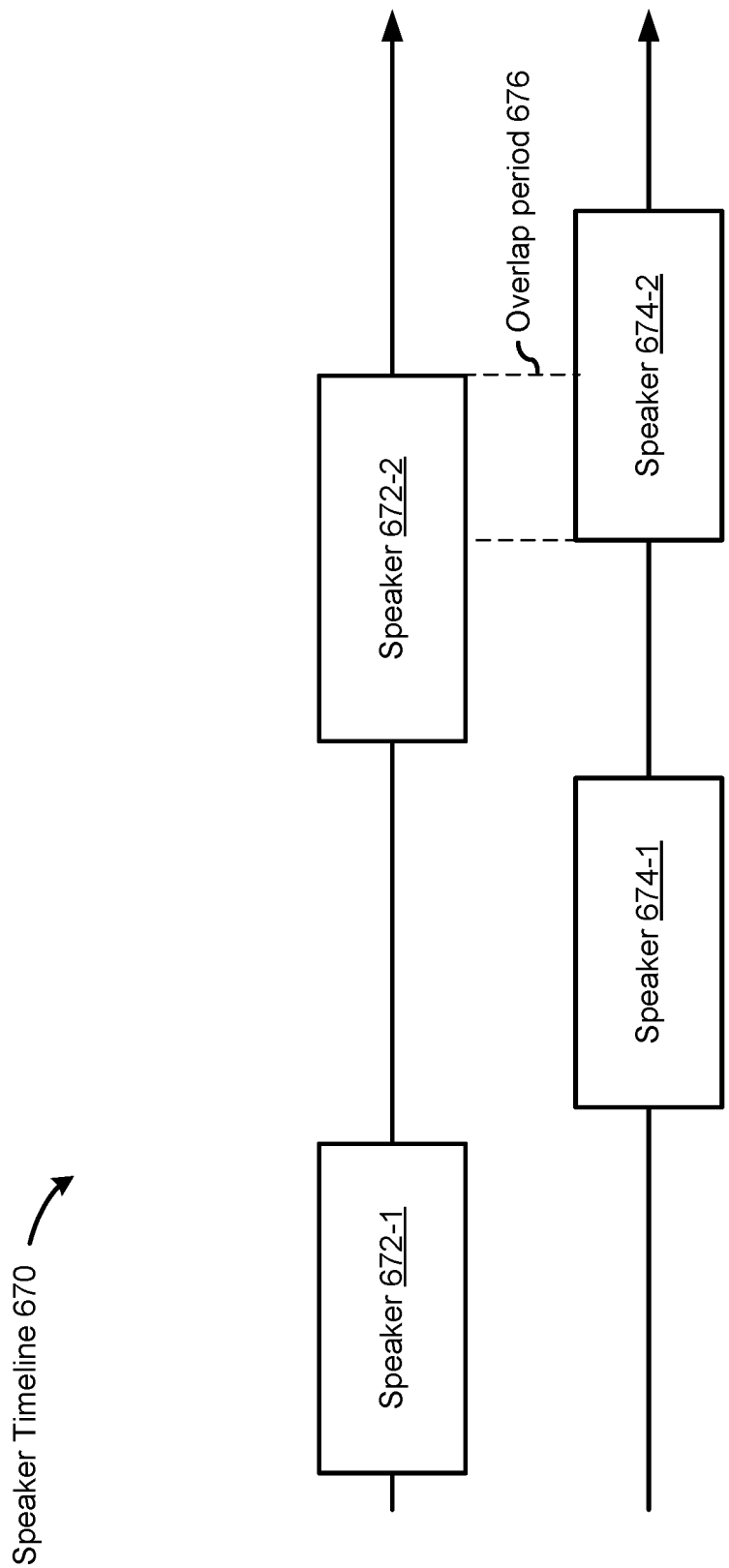
FIG. 6E is a block diagram illustrating a speaker timeline in accordance with some embodiments.

FIG. 6E is a block diagram illustrating a speaker timeline 670 in accordance with some embodiments. The speaker timeline 670 includes a speaker 672 speaking at time periods 672-1 and 672-2 and a speaker 674 speaking at time periods 674-1 and 674-2. The speaker timeline 670 also includes an overlap period 676 during which both the speaker 672 and the speaker 674 are speaking. In some embodiments, the utilization of the sparsity constraint along with the linearity property allows for identifying and disambiguating regions with overlapping speakers.

The resulting embedding sequence for the speaker timeline 670 includes an overlapping region that is a linear combination of the embeddings from the speakers 672 and 674. There are several ways of accommodating the resulting embedding sequence using the embedding basis matrix and activity matrix. In some embodiments, the overlapping region is interpreted as a new speaker embedding with a corresponding activity value of 1.0. In some embodiments, the activity value for both speakers are set to be nonzero without introducing a new speaker embedding. In some embodiments, because the introduction of a new embedding would incur an additional loss, the optimization algorithm prefers the second approach.

Figure 7A:
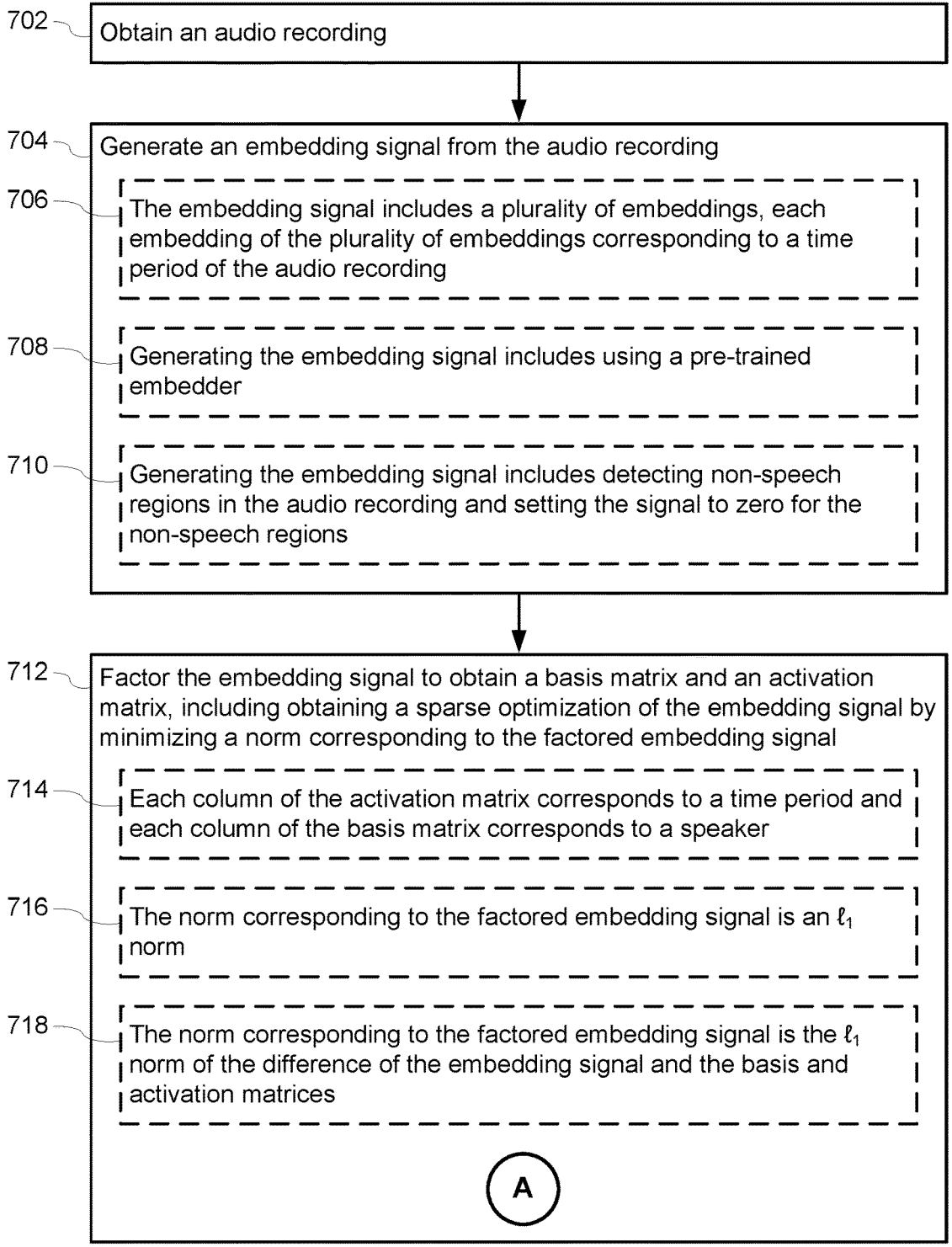
FIGS. 7A-7B are flow diagrams illustrating a method of recommending content to a user in accordance with some embodiments.
Figure 7B:
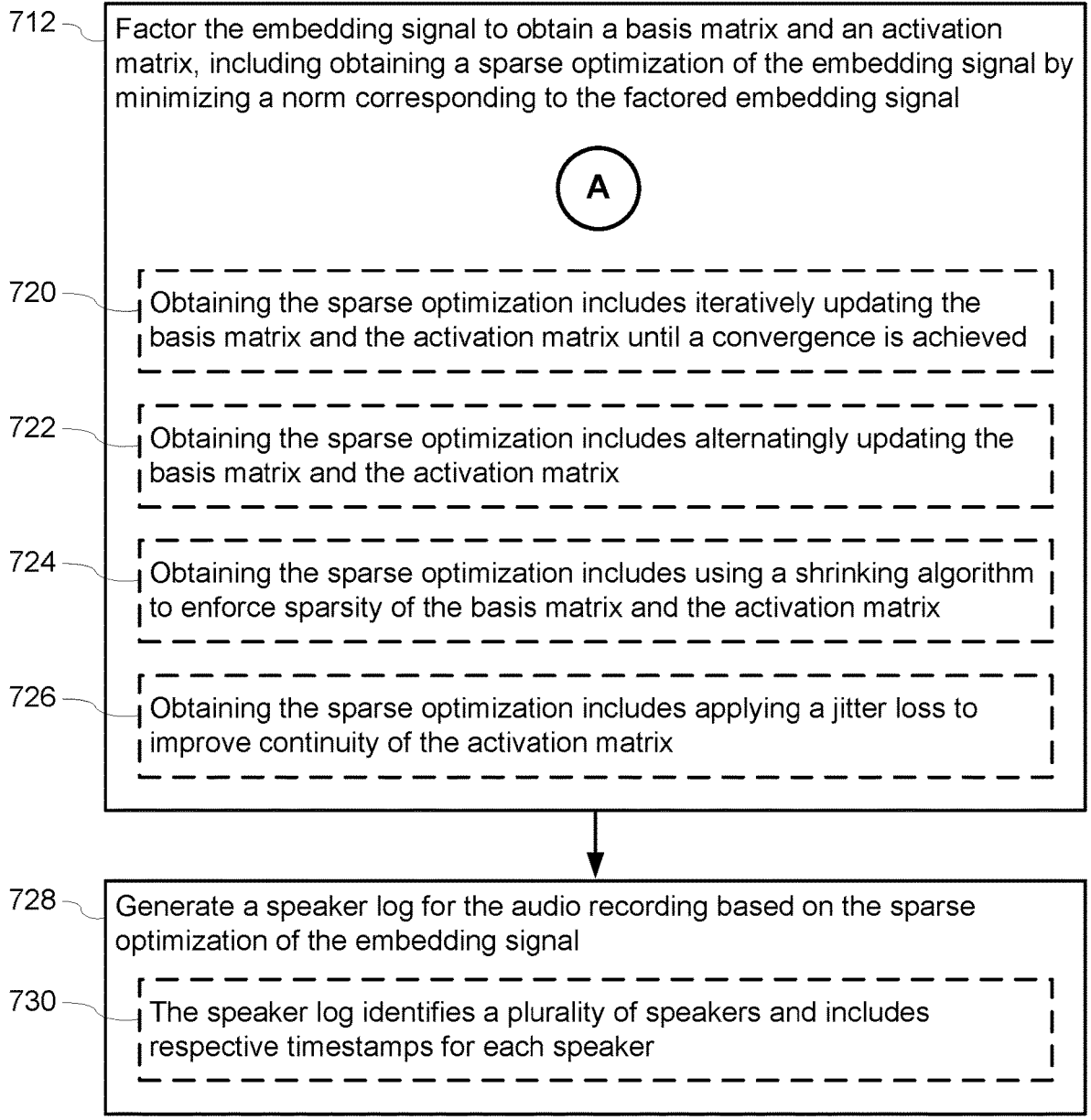

FIGS. 7A-7B are flow diagrams illustrating a method 700 of recommending content to a user in accordance with some embodiments. The method 700 may be performed at a computing system (e.g., media content server 104 and/or electronic device(s) 102) having one or more processors and memory storing instructions for execution by the one or more processors. In some embodiments, the method 700 is performed by executing instructions stored in the memory (e.g., memory 212, FIG. 2 and/or memory 306, FIG. 3) of the computing system. In some embodiments, the method 700 is performed by a combination of the server system (e.g., including media content server 104 and CDN 106) and a client device.

The system obtains (702) an audio recording. For example, the system obtains an episode of a podcast or show. As another example, the system obtains a recording from a meeting or conversation. In some embodiments, the system obtains the audio recording from a media database (e.g., the media content database 332).

The system generates (704) an embedding signal (e.g., the embedding signal 602) from the audio recording. For example, the system generates the embedding signal using the embedding module 326.

In some embodiments, the embedding signal includes (706) a plurality of embeddings, each embedding of the plurality of embeddings corresponding to a time period of the audio recording. For example, the embedding signal 602 includes a M-dimensional embedding for each time period of the T time periods.

In some embodiments, generating the embedding signal includes (708) using a pre-trained embedder. For example, the embedder is a VggVox embedder.

In some embodiments, generating the embedding signal includes (710) detecting non-speech regions in the audio recording and setting the signal to zero for the non-speech regions. For example, the non-speech regions are detecting using a trained neural network (e.g., a convolutional neural network).

The system factors (712) the embedding signal to obtain a basis matrix (e.g., the embedding basis matrix 650) and an activation matrix (e.g., the activation matrix 660), including obtaining a sparse optimization of the embedding signal by minimizing a norm corresponding to the factored embedding signal (e.g., the sparse optimization represented by Equation 2).

In some embodiments, each column of the activation matrix corresponds (714) to a time period and each column of the basis matrix corresponds to a speaker. For example, FIG. 6B shows the embedding basis matrix 650 with a speaker embedding for each column and FIG. 6C shows the activation matrix 660 with each column representing a time period.

In some embodiments, the norm corresponding to the factored embedding signal is (716) an $\ell_1$ norm. In some embodiments, the norm corresponding to the factored embedding signal is (718) the $\ell_1$ norm of the difference of the embedding signal and the basis and activation matrices.

In some embodiments, obtaining the sparse optimization includes (720) iteratively updating the basis matrix and the activation matrix until a convergence is achieved. In some embodiments, obtaining the sparse optimization includes (722) alternatingly updating the basis matrix and the activation matrix. In some embodiments, obtaining the sparse optimization includes (724) using a shrinking algorithm to enforce sparsity of the basis matrix and the activation matrix (e.g., as illustrated in FIG. 6D).

In some embodiments, obtaining the sparse optimization includes (726) applying a jitter loss to improve continuity of the activation matrix. For example, applying the jitter loss represented by Equation 3.

The system generates (728) a speaker log for the audio recording based on the sparse optimization of the embedding signal. In some embodiments, the speaker log identifies (730) a plurality of speakers and includes respective timestamps for each speaker. In some embodiments, the speaker log is stored in a media database (e.g., the metadata database 334). In some embodiments, the speaker log is used to allow users to search for particular speakers within the audio recording. In some embodiments, the speaker log is used to present speaker information to a user of the media content (e.g., as illustrated in FIG. 5B).

Although FIGS. 7A-7B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 700) of speaker diarization for audio content. The method is performed at a computing device (e.g., the electronic device 102 or the media content server 104) having one or more processors and memory. The method includes: (1) obtaining an audio recording (e.g., from a user or database); (2) generating an embedding signal (e.g., the embedding signal 602) from the audio recording (e.g., using the embedding module 326); (3) factoring (e.g., using the factorization module 328) the embedding signal to obtain a basis matrix (e.g., the embedding basis matrix 650) and an activation matrix (e.g., the activation matrix 660), including obtaining a sparse optimization of the embedding signal by minimizing a norm corresponding to the factored embedding signal (e.g., using the optimization module 329); and (4) generating a speaker log for the audio recording based on the sparse optimization of the embedding signal (e.g., using the diarization module 324). For example, the diarization procedure 420 in FIG. 4B can be used to generate a speaker log for the audio input 402.

(A2) In some embodiments of A1, the embedding signal includes a plurality of embeddings, each embedding of the plurality of embeddings corresponding to a time period of the audio recording. For example, the embedding signal 602 in FIG. 6A has a plurality of columns corresponding to different speakers at different time periods.

(A3) In some embodiments of A1 or A2, each column of the activation matrix corresponds to a time period and each column of the basis matrix corresponds to a speaker (e.g., as illustrated in FIGS. 6B and 6C).

(A4) In some embodiments of any of A1-A3, generating the embedding signal includes using a pre-trained embedder (e.g., a VggVox embedder). In some embodiments, the embedder is trained using utterances from a variety of speakers in various contexts and situations so as to capture acoustic, dialectal, and stylistic speech characteristics.

(A5) In some embodiments of any of A1-A4, generating the embedding signal includes detecting non-speech regions in the audio recording and setting the signal to zero for the non-speech regions. For example, the non-speech regions are identified using a trained neural network (e.g., Mobile-Net).

(A6) In some embodiments of any of A1-A5, the norm corresponding to the factored embedding signal is an $\ell_1$-norm. In some embodiments, the norm is a sum of the magnitudes of the vectors in space. In some embodiments, the norm is a Euclidean norm.

(A7) In some embodiments of any of A1-A6, the norm corresponding to the factored embedding signal is the $\ell_1$-norm of the difference of the embedding signal and the basis and activation matrices (e.g., as shown in Equation 2).

(A8) In some embodiments of any of A1-A7, obtaining the sparse optimization includes iteratively updating the basis matrix and the activation matrix until a convergence is achieved. For example, iteratively updating in accordance with the algorithm 1 in FIG. 6D.

(A9) In some embodiments of any of A1-A8, obtaining the sparse optimization includes alternatingly updating the basis matrix and the activation matrix. For example, alternatively updating the basis matrix and the activation matrix using a shrinking algorithm and parameter projection (e.g., using Equations 4-6).

(A10) In some embodiments of any of A1-A9, obtaining the sparse optimization includes using a shrinking algorithm (e.g., using the shrink operation of Equation 4) to enforce sparsity of the basis matrix and the activation matrix.

(A11) In some embodiments of any of A1-A10, obtaining the sparse optimization includes applying a jitter loss (e.g., the jitter loss of Equation 3) to improve continuity of the activation matrix.

(A12) In some embodiments of any of A1-A11, the speaker log identifies a plurality of speakers and includes respective timestamps for each speaker. In some embodiments, the speaker log is stored as metadata for the audio input. In some embodiments, the speaker log is queryable to allow users to search for particular speakers. In some embodiments, the speaker log is provided to a search engine to allow users to search for particular speakers. In some embodiments, the user is able to indicate a time period when a particular person is speaking and search for other time periods when the same person is speaking. In some embodiments, the speaker log is stored in a database (e.g., the speaker logs 336 in the metadata database 334). In some embodiments, a user interface is provided to allow playback of the audio input along with indication of time periods when different speakers are speaking (e.g., as illustrated in FIG. 5B).

In another aspect, some embodiments include a computing system including one or more processors and memory coupled to the one or more processors, the memory storing one or more programs configured to be executed by the one or more processors, the one or more programs including instructions for performing any of the methods described herein (e.g., the method 700 or A1-A12 above).

In yet another aspect, some embodiments include a non-transitory computer-readable storage medium storing one or more programs for execution by one or more processors of a computing system, the one or more programs including instructions for performing any of the methods described herein (e.g., the method 700 or A1-A12 above).

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method of speaker diarization for audio content, the method comprising:
at a computing device having one or more processors and memory:
obtaining an audio recording;
generating an embedding signal from the audio recording;
factoring the embedding signal to obtain a basis matrix and an activation matrix, including obtaining a sparse optimization of the embedding signal by minimizing a norm corresponding to the factored embedding signal; and generating a speaker log for the audio recording based on the sparse optimization of the embedding signal.

2. The method of claim 1, wherein the embedding signal comprises a plurality of embeddings, each embedding of the plurality of embeddings corresponding to a time period of the audio recording.

3. The method of claim 1, wherein each column of the activation matrix corresponds to a time period and each column of the basis matrix corresponds to a speaker.

4. The method of claim 1, wherein generating the embedding signal comprises using a pre-trained embedder.

5. The method of claim 1, wherein generating the embedding signal includes detecting non-speech regions in the audio recording and setting the signal to zero for the non-speech regions.

6. The method of claim 1, wherein the norm corresponding to the factored embedding signal is an $\ell_1$-norm.

7. The method of claim 1, wherein the norm corresponding to the factored embedding signal is an $\ell_1$-norm of a difference of the embedding signal and the basis and activation matrices.

8. The method of claim 1, wherein obtaining the sparse optimization comprises iteratively updating the basis matrix and the activation matrix until a convergence is achieved.

9. The method of claim 1, wherein obtaining the sparse optimization comprises alternatingly updating the basis matrix and the activation matrix.

10. The method of claim 1, wherein obtaining the sparse optimization comprises using a shrinking algorithm to enforce sparsity of the basis matrix and the activation matrix.

11. The method of claim 1, wherein obtaining the sparse optimization comprises applying a jitter loss to improve continuity of the activation matrix.

12. The method of claim 1, wherein the speaker log identifies a plurality of speakers and includes respective timestamps for each speaker.

13. A computing device, comprising:
one or more processors;
memory; and
one or more programs stored in the memory and configured for execution by the one or more processors, the one or more programs comprising instructions for:
obtaining an audio recording;
generating an embedding signal from the audio recording;
factoring the embedding signal to obtain a basis matrix and an activation matrix, including obtaining a sparse optimization of the embedding signal by minimizing a norm corresponding to the factored embedding signal; and
generating a speaker log for the audio recording based on the sparse optimization of the embedding signal.

14. The device of claim 13, wherein generating the embedding signal includes detecting non-speech regions in the audio recording and setting the signal to zero for the non-speech regions.

15. The device of claim 13, wherein the norm corresponding to the factored embedding signal is an $\ell_1$-norm.

16. The device of claim 13, wherein the norm corresponding to the factored embedding signal is an $\ell_1$-norm of a difference of the embedding signal and the basis and activation matrices.

17. The device of claim 13, wherein obtaining the sparse optimization comprises alternatingly updating the basis matrix and the activation matrix.

18. A non-transitory computer-readable storage medium storing one or more programs configured for execution by a computing device having one or more processors and memory, the one or more programs comprising instructions for:
obtaining an audio recording;
generating an embedding signal from the audio recording;
factoring the embedding signal to obtain a basis matrix and an activation matrix, including obtaining a sparse optimization of the embedding signal by minimizing a norm corresponding to the factored embedding signal; and
generating a speaker log for the audio recording based on the sparse optimization of the embedding signal.

19. The non-transitory computer-readable storage medium of claim 18, wherein obtaining the sparse optimization comprises iteratively updating the basis matrix and the activation matrix until a convergence is achieved.

20. The non-transitory computer-readable storage medium of claim 18, wherein the norm corresponding to the factored embedding signal is an $\ell_1$-norm of a difference of the embedding signal and the basis and activation matrices.

* * * * *